HOWARD J. MURPHY,

By Philip E. Parker

Attorney

Patented Oct. 16, 1951

2,571,747

UNITED STATES PATENT OFFICE 2,571,747

BOLT FASTENER

Howard J. Murphy, Lynnfield, Mass., assignor to United-Carr Fastener Corporation, Cambridge, Mass., a corporation of Massachusetts Application December 10, 1948, Serial No. 64,601

1 Claim. (Cl. 151—33)

The present invention relates to fastener secured installations and fasteners therefor and aims generally to improve existing installations and fasteners.

A primary object of the present invention is the provision of an improved fastener secured installation adapted for attachment to an apertured support, particularly in blind installations where the support is accessible from only one side thereof.

A further object of the invention is the provision of a fastener secured installation including a fastener member adapted for snap fastener engagement with an apertured support and a threaded stud member secured by said fastener and extending beyond the support to threadedly receive a part to be secured thereto.

A still further object of the invention is the provision of a fastener secured installation which will serve as an efficient shelf support for blind assemblies, for example refrigerators and the like.

A still further object of the invention is the provision of an improved fastener, member and stud member adapted to be preassembled and insertable as a unit in an apertured support by a snap fastener action.

The above and other objects and advantages of the invention will be apparent to persons skilled in the art to which the invention relates from a consideration of the accompanying drawings and annexed specification illustrating and describing a preferred embodiment of the invention.

Figure 1:
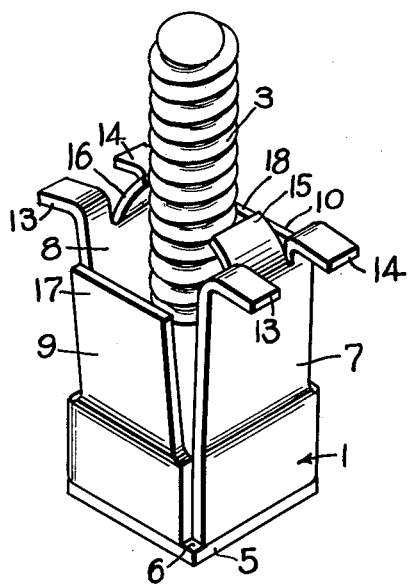
Fig. 1 is a perspective view of the improved snap fastener device with a stud bolt or the like positioned therein.
Figure 2:
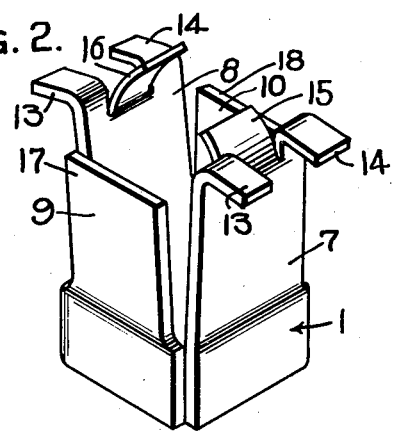
Fig. 2 is a perspective view of the snap fastener device alone.
Figure 3:
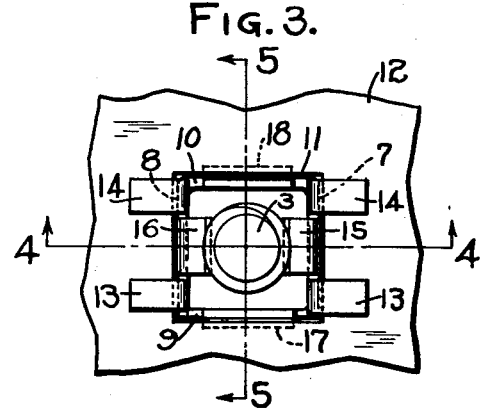
Fig. 3 is a plan view of the snap fastener device assembled in an apertured support.
Figure 6:
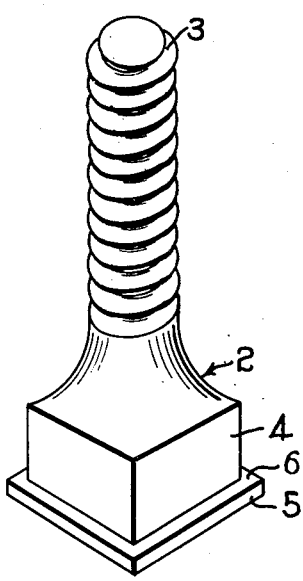
Fig. 6 is a perspective view of the stud bolt or screw.
Figure 4:
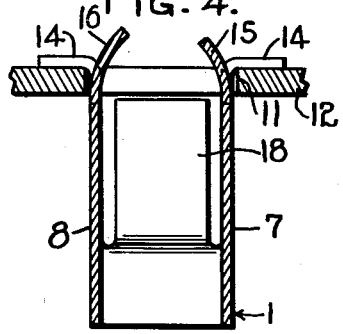
Fig. 4 is a longitudinal sectional view of the device taken on line 4—4 of Fig. 3.

Referring now to the drawings, the improved fastener installation of the present invention comprises a fastener member 1 and a stud bolt or member 2 assembled together and adapted to be inserted as a unit in an apertured support with an end portion of the bolt or screw protruding from the support a predetermined amount for engagement with a supporting spindle, spool or like element.

The stud bolt or screw 2 advantageously may have a threaded portion 3, a square head portion 4 and an enlarged head flange 5 forming a shoulder 6. The head of the bolt is adapted to be received by the fastener member with the square portion 4 snugly fitting within the walls of the fastener and the shoulder 6 engaging the ends of the fastener to thereby prevent rotation of the stud or screw and relative axial movement in one direction. The square construction of the head portion is preferred since this affords maximum resistance to turning. However, other non-circular cross-sectional configurations such as rectangular, hexagonal, octagonal and the like may be used without departing from the scope of the invention.

The fastener member 1 preferably comprises an open ended sleeve or cage having oppositely disposed side wall portions 7 and 8 joined along their lower edges to other oppositely disposed side wall portions 9 and 10 thus forming a substantially square stud-receiving portion adapted to be passed through an aperture 11 in the support 12 and to snugly receive therein the square portion 4 of the stud 2.

The side wall portions 7 and 8 are provided at one of their ends with outwardly extending support-engaging members 13 and 14 adapted to bear against an outer surface of a support and to limit the movement of the fastener member inwardly through an aperture thereof. Additional members 15 and 16 extend inwardly from the upper ends of the side wall portions 7 and 8 and are adapted to engage the threads of the bolt or screw 2 to provide a support for the stud intermediate its ends and hold it in assembled relationship with the fastener member 1 while assembling the unit in an apertured support.

The fastener member may be retained in engagement with the support by means of resilient portions or tongues 17 and 18 of reduced width formed integrally with the side wall portions 9 and 10 terminating short of the ends and of the support-engaging portions 13 and 14 so as to engage an inner surface of a support by a snap fastener action and hold the fastener and unit in place therein.

In assembling the unit the stud or bolt 2 is first inserted through the open end of the fastener member 1 and pushed therethrough until the shoulder 6 on the head of the stud engages the end of the fastener body. The square head 4 of the bolt or screw 2 will then be positioned in the square recess portion of the fastener member 1 and held therein by engagement of the inwardly projecting members 15 and 16 in the thread grooves 3 of the stud as shown in Fig. 1.

Figure 5:
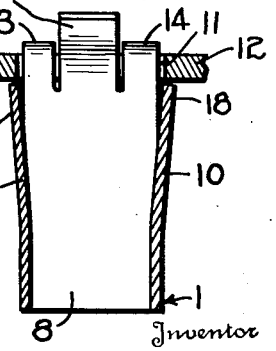
Fig. 5 is a longitudinal sectional view of the device taken on line 5—5 of Fig. 3.

The fastener 1 with the stud bolt or screw 2 positioned therein is then inserted as a unit through the aperture 11 of a support 12 until the support-engaging members 13 and 14 engage the outer portion of the support. During this operation the outwardly flared upper resilient portions 17 and 18 of the side portions 9 and 10 will be forced inwardly by the sides of the aperture 11. When the upper ends of the flared portions 17 and 18 clear the edges of the opening 11 they will snap outwardly beyond the edges of the opening as shown in Fig. 5, and thus lock the fastener in assembled position in the apertured support 12. Any type of supporting spindle, spool or like element may then be attached to the threaded portion 3 of the stud 2 and securely held thereby against the support 12.

Inasmuch as the fastener member and assembled stud are inserted as a unit from the same side of the support 12, the assembly is useful in blind installations in which the support has but one accessible side.

It will thus be seen that the fastener assembly of the present invention is simple and economical in construction and easily installed in an apertured support without the use of special tools. It is advantageous as a shelf support for refrigerators and the like because of its ready assembly with an apertured support and the provision of a bearing support for the stud intermediate its ends.

Although I have illustrated and described a preferred form of my invention, I do not wish to be limited thereby because the scope of my invention is best defined by the following claim.

I claim:

A fastener for mounting in an apertured support comprising an open ended non-circular sleeve member having a non-circular stud bolt head-receiving portion extending inwardly from one end thereof and adapted to receive a non-circular portion of a flanged head of a stud with the flange thereof in engagement with the end of the sleeve member and the shank thereof extending through said sleeve member, a pair of opposed side portions extending longitudinally from said stud head-receiving portion, said side portions having adjacent the ends thereof outwardly extending support-engaging tongues for engaging one surface of a support on opposite sides of a support aperture therein and inwardly extending stud-engaging tongues for engaging the shank of a stud to hold it in assembled relation with the sleeve member, and a second pair of opposed longitudinally extending side portions intermediate said first named side portions and having their terminal ends spaced longitudinally toward said head portion from said outwardly extending support-engaging tongues an amount slightly greater than the support thickness, said second pair of opposed side portions being laterally resilient and inclined outwardly so that the terminal ends thereof are disposed beyond the edges of a support aperture for engagement with a surface of a support opposite to that engaged by said outwardly extending support-engaging tongues.

HOWARD J. MURPHY.

REFERENCES CITED

The following references are of record in the file of this patent:

UNITED STATES PATENTS

| Number | Name | Date |
|---|---|---|
| 1,511,542 | Tomkinson | Oct. 14, 1924 |
| 1,521,658 | Tomkinson | Jan. 6, 1925 |
| 1,616,438 | Brooks | Feb. 8, 1927 |
| 1,796,781 | Fullman | Mar. 17, 1931 |
| 1,826,201 | Carroll | Oct. 6, 1931 |
| 2,283,122 | Murphy | May 12, 1942 |
| 2,342,832 | Borchers | Feb. 29, 1944 |
| 2,372,716 | Evans | Apr. 3, 1945 |
| 2,400,545 | Kost | May 21, 1946 |
| 2,411,364 | Butterfield | Nov. 19, 1946 |

FOREIGN PATENTS

| Number | Country | Date |
|---|---|---|
| 392,025 | Great Britain | May 11, 1933 |